United States Patent
Leijonhufvud

(10) Patent No.: US 6,856,677 B2
(45) Date of Patent: Feb. 15, 2005

(54) CALL QUEUE HANDLING

(75) Inventor: Carl Leijonhufvud, Uppsala (SE)

(73) Assignee: Ab Aurora Invest, Uppsala (SE)

( * ) Notice: Subject to any disclaimer, the term of this patent is extended or adjusted under 35 U.S.C. 154(b) by 67 days.

(21) Appl. No.: 10/250,315

(22) PCT Filed: Feb. 20, 2002

(86) PCT No.: PCT/SE02/00296

§ 371 (c)(1),
(2), (4) Date: Jun. 30, 2003

(87) PCT Pub. No.: WO02/067557

PCT Pub. Date: Aug. 29, 2002

(65) Prior Publication Data

US 2004/0066928 A1 Apr. 8, 2004

(30) Foreign Application Priority Data

Feb. 22, 2001 (SE) .............................................. 0100596

(51) Int. Cl.⁷ ........................ H04M 1/57; H04M 3/432; H04M 3/527; H04M 15/06
(52) U.S. Cl. .............................. 379/210.01; 379/93.23; 379/142.17
(58) Field of Search ........................... 379/93.17, 93.23, 379/142.01, 142.17, 209.01, 210.01, 266.01

(56) References Cited

U.S. PATENT DOCUMENTS 5,155,761 A * 10/1992 Hammond ................. 379/88.2
5,434,906 A * 7/1995 Robinson et al. ......... 379/88.23
5,568,540 A * 10/1996 Greco et al. ............. 379/88.25
5,581,604 A   12/1996 Robinson et al.
5,625,676 A * 4/1997 Greco et al. ............. 379/88.14

FOREIGN PATENT DOCUMENTS

| EP | 0587950 A1 | 3/1994 |
| WO | WO 9711413 A1 | 3/1997 |
| WO | WO 9939490 A1 | 8/1999 |

* cited by examiner

Primary Examiner—Harry S. Hong
(74) Attorney, Agent, or Firm—Sughrue Mion, PLLC

(57) ABSTRACT

An arrangement and a method for handling answers at a telephone. The arrangement includes a connection device; an identification device identifying an A number belonging to a caller; and a processing device arranged to create at least two answering alternatives, where each answering alternative includes a respective point of time when a called party at the telephone intends to call back. The answering alternatives are displayed on a display together with an indication of the A number. An input device is utilized to select one of the at least two answering alternatives, whereby the processing device is arranged to transmit the selected answering alternative to the A number. The selected answering alternative and indication of the A number is displayed on the display as a reminder for the called party.

16 Claims, 2 Drawing Sheets

CALL QUEUE HANDLING

FIELD OF INVENTION

Figure 1:
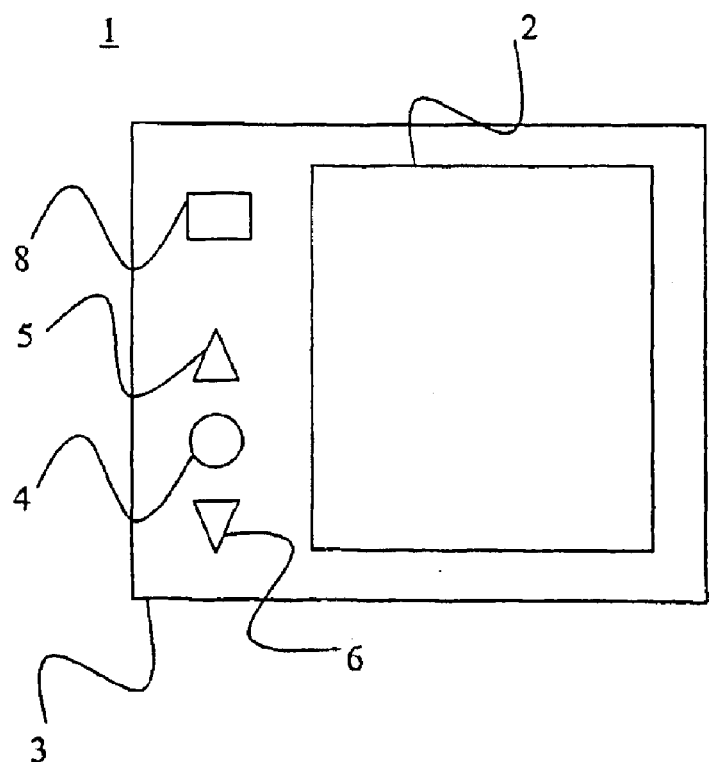

The present invention generally relates to call queue handling, and specifically to selection of answering alternatives at a telephone to handle a caller.

BACKGROUND OF THE INVENTION

Today, telephones are very frequently used and it is common that a caller calling a large company is placed in a call queue where the caller has to wait until someone is ready to talk to the caller. There are a variety of telephone exchange systems developed to handle such call queues. There also exist so-called "call-back"systems, such that a caller need not wait in a call queue, but may instead chose when he wants to be called back. Such systems are large, complex and expensive.

Also, a private person or a small business may sometimes be busy (e.g. on the phone or in a meeting with a customer/patient) when a caller calls. It is then desirable to be able to notify the caller without having to interrupt an ongoing activity without having to obtain and install a telephone exchange that can cope such a function.

There are today a few solutions which are usable for private persons or small businesses, such as answering machines and caller identifiers. An answering machine gives the called party a possibility to notify a caller a preselected message. A caller identifier gives the called party a possibility to see who has called and when. These solutions are not particularly flexible, which is a problem for a person who uses telephony a lot.

SUMMARY OF THE INVENTION

An object of the present invention is to provide a call queue handling device for private persons or small businesses that is flexible and that is easy to install and easy to use.

This object, among others, is achieved according to the present invention by an arrangement according to claim 1 and a method according to claim 12, respectively.

An advantage of the present invention is that the called party may easily inform the caller that he has the intention to call back without interrupting an ongoing activity, such as a call or a meeting with a customer/patient.

Further characteristics of the invention will be evident from the dependent claims.

According to a preferred embodiment of the present invention the caller is informed of a definite point of time when the called party intends to call back. An advantage thereof is that the caller not need distinguish what time it is when he calls the called party.

According to another preferred embodiment of the present invention the caller is automatically called back if the called party have not called back within the period of time, which the caller was informed of. An advantage with this is that the caller does not need to wait in uncertainty in case of impediment for the called party.

Further characteristics and advantages of the present invention will be evident from the following description.

SHORT DESCRIPTION OF THE DRAWINGS

Figure 2:
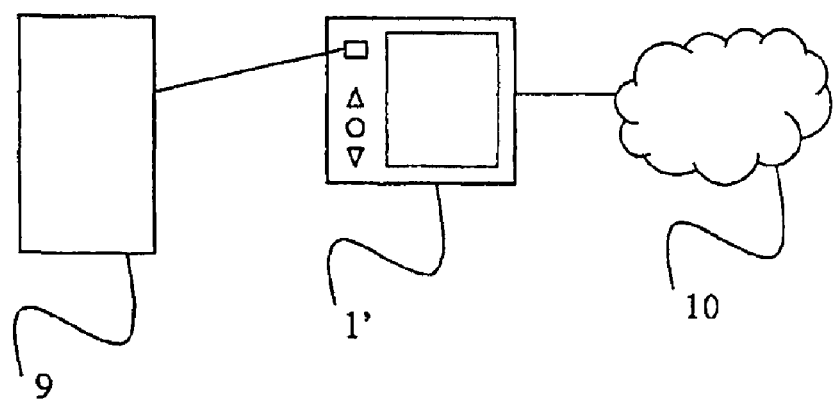
Figure 3:
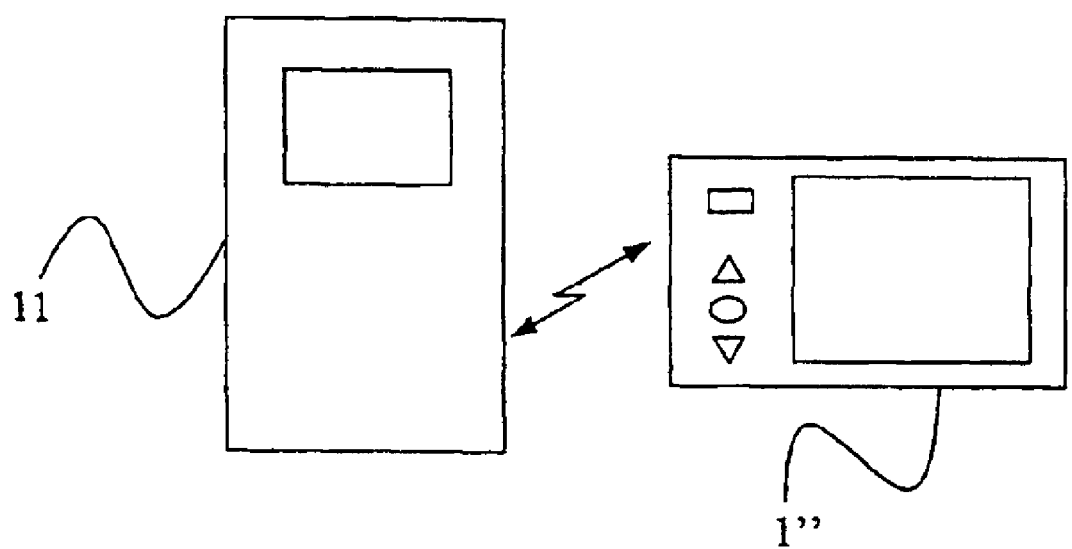

The present invention will become more fully understood from the detailed description of the embodiments given below and the enclosed drawings, which are given for illustration only, and thus, are not limiting for the present invention, wherein:

FIG. 1 schematically shows an arrangement according to the present invention,

FIG. 2 schematically shows an arrangement connected to a fixed telephone according to the present invention, and FIG. 3 schematically shows an arrangement connected to a cellular phone according to the present invention.

DETAILED DESCRIPTION OF EMBODIMENTS

In the following description, for purpose of explanation and not limitation, specific details are set forth, such as particular techniques and applications, in order to provide a thorough understanding of the present invention. However, it will be obvious for a person skilled in the art that the present invention may be practised in other embodiments that depart from these specific details. In other instances detailed descriptions of well-known methods and arrangements are omitted in order not to obscure the description of the present invention with unnecessary details.

A first embodiment of the present invention will now be described with reference to FIG. 1.

An answering arrangement for handling answers at a telephone comprises a display 2, a housing 3, a keypad including an activation button 4 and two selection keys 5 and 6, and a connection device 8 for connecting the answering arrangement 1 to the telephone. Further, inside the housing 3 there is included an identification device in order to automatically identify a telephone number, called the A number, from a caller. If the A number is unlisted, or cannot be identified for any other reason, the caller is requested to identify what telephone number he wants the called party to call back to. This may be given either by DTMF (Dual Tone Multi Frequency) tones or by speech. Speech identification requires more computer capacity but also provides the possibility for a caller without a DTMF facility to identify his telephone number. Such a request is controlled by a processing device, such as a micro computer, positioned in the housing 3.

The answering arrangement 1 will show a few answer alternatives on the display 2, when a caller calls the telephone connected to the answering arrangement 1. It is the processing device that creates the answering alternatives emanating from predetermined parameters. It may e.g. have been specified that answering alternatives are to be shown as: within 5 minutes, in 15 minutes, in 30 minutes and after 1 hour. By means of the selection keys 5 and 6 it is then possible to step up/down between the answering alternatives and select e.g. in 15 minutes by pressing the activation key 4.

The input keys may be designed in many different alternative ways. An activation key may be omitted by allowing alternatives that have been marked in e.g. 5 seconds to be selected without an active pressing, preferably with the exception for the case when an alternative is marked directly upon reception of a call. In such a case you should first move the marker before an alternative is automatically selected, e.g. after 5 seconds. The selection keys may also be designed as a scroll button, as a slidable button, or as a lever/mouse. Also, a touch display is an obvious alternative. Yet a further alternative is that the answering alternatives being marked e.g. by a number and that the activation keys being corresponding numeric keys 0–9.

Apart from displaying the different answering alternatives the A number is displayed on the display so that the called party is given a possibility to know to whom he shall call back. If the A number is 123 the display could show:

Caller: 123

Carl will call you back within 5 minutes.
Carl will call you back in 15 minutes.
Carl will call you back in 30 minutes.
Carl will call you back after 1 hour.

The answering arrangement emits a signal, such as a sound, a vibration or a light signal, to notify the called party that a call is incoming. Such a signal is also emitted even if the called party is busy with an ongoing call. To make it easier for the called party to identify who the caller is the A number may be associated with an alias (programmed by the user of the answering arrangement) and if the caller's A number has an alias this is shown on the display instead of, or together with, the A number.

One of the answering alternatives is selected by the user and then the selected answering alternative is transmitted to the A number. On the display there is shown which A number and/or alias that shall be called back and when, or after how long time. The remaining time may be counted down and updated on the display.

If then someone further is calling, the display will show: at the top of the display who shall be called back and when; below this the number/alias of which is currently queuing; at the bottom the answering alternatives which may be selected for the current caller. The answering alternatives are determined by the predetermined parameters but also by the already selected answering alternatives, i.e. a previously selected answering alternative will not be shown again, such that the called party need not risk double booking of call back time.

To ensure that the caller has understood the answering message he may be asked to confirm that the information has been received or to request a retransmission of the message, preferably by DTMF signalling. Further, a request for confirmation may be used by the caller to avoid being called back by not confirming that the information has been received. This may e.g. be usable if the caller knows that he will not be able to answer at the suggested call back time.

When the call back time according to a selected answering alternative has expired or just before the point of time has expired, the answering arrangement emits a signal, such as a sound, a vibration or a light signal, to remind the called party about the promised call back. Preferably, such a reminder signal differs from a signal signalling that a call has been received. Such a signal is emitted even if the called party is occupied by an ongoing call. If the called party does not call back within the promised point of time or after an extra time of e.g. two minutes the arrangement will automatically call and inform the caller that the called party has not been able to call back at the promised point of time and to ask if the called party may call back at a later occasion. The extra time may alternatively be dependent on how long the period was until the promised call back time, i.e. a long time until call back time gives a long extra time. Preferably, the caller is asked to confirm this message by DTMF signalling or speech. Such an automatic call does not take place before a reminder signal has been given to the called party.

When the called party calls back to a caller shown on the display, which may be performed by marking and activating the answering message that this caller is to be called back, that message is removed from the display after the call back has been terminated. Also, it is possible to remove such a message from the display without first calling up. Possibly, the message is not automatically removed but a signal will remind the user that the call has been performed and the marking on the display may be removed. If e.g. another one than the one having called the called party answers the call back, the user should be able to indicate call back instead of removing the message from the display.

According to a second embodiment of the present invention the answering arrangement comprises, apart from that included in the first embodiment, a clock or the like for creating a time reference. By providing the answering arrangement with a clock the points of time specified to the caller (and the ones shown on the display) may indicate a definite point of time, e.g. at 1430. An advantage with a definite point of time, compared to a relative point of time such as in 30 minutes, is that the point of time need not be updated on the display. Further, the caller need not check the point of time when he receives the information of when the called party intends to call back.

An example of what may be shown on the display, if A number 321 calls at 1200 and has Peter as programmed alias, is:

| CALLER: Peter, 321 | CALL BACK TIME |
|---|---|
| Carl will call you back within 30 minutes. | 1200–1230 |
| Carl will call you back in 30 minutes. | 1230 |
| Carl will call you back at 1230. | 1230 |
| Carl will call you back after 1600. | 1600* |

The symbol * is an example of a symbol which may be used for marking that a call shall be performed after a certain definite time. In the three first cases it may be suitable with a reminder alarm signal three minutes after the expiration of the time limit while in the fourth case a suitable time limit may be one or two hours.

If the user of the answering arrangement knows that he is busy a certain time, e.g. up to 1100, the definition of the parameters may be chosen so that the answering alternatives will contain proposals of call back points of time with intervals of 10 minutes beginning at 1110 and where selected answering alternatives will be removed as possible new answering alternatives. The processing device shall also be able to create tailored answering alternatives for specific A numbers. If for instance a caller with a specific A number calls, e.g. 45 minutes may be reserved for that call instead of just 10 minutes, i.e. the creation of answering alternatives for the subsequent caller does not give alternatives that collide with the reserved time.

Alternatively, the user may, if he is busy during a certain time, e.g. up to 1100, state automatic reservation of points of time for an interval between 1100 and 1300. There are e.g. first five points of time reserved with an interval of five minutes, such that the called party may call back the caller for a short call or make an agreement about a longer call later on. Thereafter points of time are reserved for a call back in intervals of e.g. 15 minutes.

When the answering arrangement comprises a clock, such that a definite point of time may be specified, there is a further advantage if the identification device also can identify which area number and/or country number that the caller calls from. In this way the answering alternative that is given to the caller may be adjusted if he is in another time zone than the called party. The message shown on the display is however suitably displayed without adjustment. However, if the user calls someone in another time zone than his own the local time zone at the receiver is also displayed in connection with the country/area number. In this way it is easy for the user to become aware of why no one answers if it e.g. is night time at the receiver.

If it is not possible to identify from which time zone the caller calls (e.g. if the caller calls from a cellular phone), relative answering alternatives are specified instead. For clarification it is possible to specify both relative and definite points of time, e.g.: Carl will call you back in 15 minutes, that is 1415.

Another way to use the area number of the A number is to thereby identify in which language that it is most suitable to answer. Thus, if the area number is identified to belong in the USA, the selected answering alternative is transmitted in English, if the area number is identified to belong to Spain, the selected answering alternative is transmitted in Spanish, etcetera.

Next, an answering device as described above connected to a fixed network (PSTN) is described with reference to FIG. 2.

The answering arrangement 1' is connected between a telephone 9, intended for PSTN, and the PSTN 10. A "data connector" is connected between the answering arrangement 1' and a connector for the PSTN 10 and the "data connector" of the telephone 9 is connected to the answering arrangement 1'. It is also possible that a telephone is manufactured with a built-in answering arrangement. Such a phone may use the keypad of the telephone as input and activation keys.

A disadvantage of a built-in answering arrangement is that a short break must probably be made in an ongoing call to select an answering alternative. An advantage is that the answering arrangement is easily at hand, which is most advantageous when a wireless telephone or mobile phone is used. Alternatively, only one contact may be connected between the answering arrangement and the phone and none between the answering arrangement and the PSTN, whereby all signalling is performed through the phone. The connections between the answering arrangement and the telephone may easily be replace with wireless communication.

An answering arrangement as described above connected to a mobile phone will now be described with reference to FIG. 3.

The answering arrangement 1" is connected to a mobile phone 11 through a radio connection, such as Bluetooth, and functions similarly to an answering arrangement at a fixed telephone connected only to the telephone. The answering arrangement may also be connected through a cable or by direct contact (mechanically connected) to the mobile phone. An advantage with a physical connection is that the arrangement is at hand but a disadvantage is that it may be bulky when handling the mobile phone. As in the case of a fixed telephone an answering arrangement may also be built-in in a mobile phone with corresponding advantages and disadvantages, respectively.

It is obvious that the present invention may be varied in a plurality of ways. Such variations are not be seen as deviations from the scope of the present invention. All such variations, which are obvious for a person skilled in the art, are intended to be included within the scope of the present invention.

With an answering arrangement that selects an answer alternative without an active selection as described above, this answer alternative may, e.g. after 20 seconds or after 2 ring signals, function as a general message, i.e. as an answering machine combined with a caller identifier informing the caller that the called party asks to be permitted to come back at a later occasion. It is also possible that, when e.g. the called party is busy on the phone, the answering arrangement selects an answering alternative without active choice without a time delay in order to obtain an answering machine function. In such a case the display shows that such a message has been submitted to the A numbers connected to the caller, alternatively to the alias connected thereto.

What is claimed is:

1. An arrangement for handling answers at a telephone, said arrangement comprising:
    a connection device for connecting said arrangement to said telephone; and
    an identification device for identifying a telephone number, called an A number, belonging to a caller;
    a processing device arranged to create at least two answering alternatives, where each answering alternative comprises a respective point of time when a called party at said telephone is calling back, wherein each point of time differs from the rest of the points of time;
    a display for showing said answering alternatives and for indicating said A number; and
    an input device for selection of one of said at least two answering alternatives, whereby said processing device is arranged to transmit said selected answering alternative to said A number and to show said selected answering alternative and indicating said A number on said display and to remove said selected answering alternative as possible answering alternative.

2. Arrangement according to claim 1, comprising a clock device for establishing a time reference to create a definite time.

3. Arrangement according to claim 1, wherein said identification device comprises means for identifying a time zone, from which said A number is calling.

4. Arrangement according to any of claim 1, wherein said identification device is arranged to request said A number from said caller for identification of said A number via DTMF tones or speech, if automatic identification of said A number fails.

5. Arrangement according to any of claim 1, comprising a signaling device for indicating to said called party that a call is incoming.

6. Arrangement according to claim 1, wherein said signaling device is arranged to alarm said called party, when said point of time in said shown selected answering alternative has passed.

7. Arrangement according to claim 1, wherein said processing device is arranged to create answering alternatives in dependence of said A number.

8. Arrangement according to claim 1, wherein said processing device is arranged to call said A number, when said point of time has expired, to inform said caller that said call back of said selected answering alternative failed.

9. Arrangement according to claim 8, wherein said processing device is arranged to request confirmation from said caller by DTMF tones or by speech.

10. Arrangement according to claim 8, wherein said processing device is arranged to indicate on said display that said A number has been called.

11. Arrangement according to claim 1, wherein said arrangement is built-in in said telephone.

12. Method for handling answers at a telephone, comprising the steps of:
    identifying a telephone number, called an A number, belonging to a caller;
    creating at least two answering alternatives, where each answering alternative comprises a respective point of time when a called party at said telephone calls back, wherein each point of time differs from the rest of the points of time;
    showing said answering alternatives and indicating said A number on a display;
    selecting one of said at least two answering alternatives;

transmitting said selected answering alternative to said A number;

showing said selected answering alternative and indicating said A number on said display; and removing said selected answering alternative as possible answering alternative.

13. Method according to claim 12, wherein said step of creating creates definite points of time.

14. Method according to claim 12, wherein said step of identifying identifies the time zone associated with said A number.

15. Method according to claim 12, wherein said step of transmitting is followed by a step of calling comprising calling said A number after said point of time having expired for informing said caller that call back of said selected answering alternative has failed.

16. Method according to claim 15, wherein said step of calling is followed by a step of confirmation comprising a request for said caller to confirm that said information has been received.

* * * * *